United States Patent Office 3,795,715
Patented Mar. 5, 1974

---

3,795,715
THERMOPLASTIC MOULDING COMPOSITIONS ON THE BASIS OF POLYACETAL AND PROCESS FOR THEIR PREPARATION
Harald Cherdron and Karlheinz Burg, Wiesbaden, and Klemens Gutweiler, Hofheim, Taunus, Germany, assignors to Farbwerke Hoechst Aktiengesellschaft vormals Meister Lucius & Bruning, Frankfurt am Main, Germany
No Drawing. Continuation of abandoned application Ser. No. 830,089, June 3, 1969. This application Aug. 20, 1971, Ser. No. 173,691
The portion of the term of the patent subsequent to Dec. 28, 1988, has been disclaimed
Int. Cl. C08d 9/02; C08f 29/12
U.S. Cl. 260—823     14 Claims

ABSTRACT OF THE DISCLOSURE

The impact strength of thermoplastic polyacetals is improved by admixing small amounts of polymers which have a softening temperature below the crystallite melting point of the polyacetal and a second order transition temperature within the range of from −120° to +30° C. and which are present in the mixture in the form of particles of diameters within the range of from 0.1 to 5 microns. The polyacetals so modified are suitable for the manufacture of finished or semi-finished products.

---

The present invention relates to thermoplastic moulding compositions on the basis of polyacetal and a process for their preparation.

This application is a continuation of application Ser. No. 830,089, filed on June 3, 1969, now abandoned.

It is known that by admixture of rubber-like polymers to thermoplastic materials the impact strength of the latter may be increased and their hardness simultaneously reduced. For this purpose the following mixtures are known: mixtures of copolymers of ethylene and vinyl acetate with polyolefins, mixtures of the said copolymers with poly (vinyl chloride) and mixtures of copolymers of ethylene and acrylic acid ester with polyethylene (cf. French Pat. 1,287,912, Belgian Pat. 609,574 and U.S. Pat. 2,953,541).

Polystyrenes of high impact strength which are obtained by incorporating polydiene caoutchoucs, for example polybutadiene or copolymers of butadiene and acrylonitrile, in polystyrene during or after the polymerization, have been thoroughly examined (cf. Makromolekulare Chem. 101,- 296 (1967)).

The present invention provides thermoplastic moulding compositions on the basis of polyacetal, which consist of a mixture of (a) 99.9 to 90% by weight of a homopolymer or copolymer of formaldehyde or trioxane of an average molecular weight within the range of from 5,000 to 200,000 and
(b) 0.1 to 10% by weight of a polymer of an average molecular weight within the range of from 1000 to 1,000,000, which has a softening temperature below the crystallite melting point of the polyacetal used according to (a) and a second order transition temperature within the range of from −120° to +30° C. and which is present in the mixture in the form of particles of diameters within the range of from 0.1 to 5 microns.

The present invention also provides a process for the preparation of thermoplastic moulding compositions on the basis of polyacetal, which comprises homogeneously mixing, at temperatures within the range of from 150 to 250° C., (a) 99.9 to 90 parts by weight of a homopolymer or copolymer of formaldehyde or trioxane of an average molecular weight within the range of from 5,000 to 200,000 and
(b) 0.1 to 10 parts by weight of a polymer of an average molecular weight within the range of from 1,000 to 1,000,000, which has a softening temperature below the crystallite melting point of the polyacetal used according to (a), and a second order transition temperature within the range of from −120° to +30° C., component (b) being present in the mixture in the form of particles of diameters within the range of from 0.1 to 5 microns.

The moulding compositions in accordance with the invention are distinguished by a considerably improved strength as compared with pure polyacetal (polyoxymethylene), without the hardness and stiffness being reduced.

It could not be foreseen that the impact strength of polyacetals is improved by admixing small amounts of polymers of very different chemical structure. A comparison with the above mixtures of polyolefins, polyvinyl chloride or polystyrene shows that only a few selected polymers are capable of improving the impact strength of the mixture, whereas with polyacetals a wide variety of polymer substances can be used. It is furthermore surprising that the particle size of the incorporated, disperse phase has a pronounced action on the impact strength of the polymer mixture, this action lying in that the impact strength is improved only by using polymers the particles of which have a diameter within a determined range. Such a dependence is known for polystyrene, but the range of the efficient particle diameters is considerably wider and shifted towards larger diameters than in the case of polyacetals (cf. Makromolekulare Chem. 101, 296 et seq. (1967), FIGS. 1 and 8).

By polyacetals there are to be understood homopolymers of formaldehyde or of trioxane the terminal OH-groups of which have been stabilized against degradation by esterification or etherification, as well as their copolymers of formaldehyde or of trioxane the terminal OH-acetals in amounts of 0.1 to 20, preferably 0.5 to 10% by weight are particularly suitable.

By cyclic ethers there are to be understood compounds of the Formula (I),

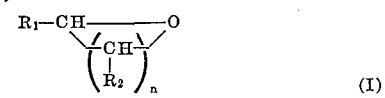

in which $R_1$ and $R_2$ are identical or different and each stand for a hydrogen atom, a phenyl radical, an aliphatic alkyl radical with 1 to 5, preferably 1 to 3 carbon atoms or an aliphatic alkyl radical with 1 to 5, preferably 1 to 3 carbon atoms, substituted by 1 to 3 halogen atoms, preferably chlorine atoms, and $n$ is a whole number from 1 to 4.

Cyclic ethers with 3 ring members are preferably used, particularly compounds of the Formula (II),

in which $R_3$ stands for a hydrogen atom, a phenyl radical, a saturated aliphatic alkyl radical with 1 to 3 carbon atoms or a saturated aliphatic alkyl radical with 1 to 3 carbon atoms substituted by 1 to 3 halogen atoms, preferably chlorine atoms.

As cyclic ether with 3 ring members ethylene oxide is particularly suitable; styrene oxide, propylene oxide and epichlorhydrin are also suitable.

As three-membered cyclic ether there may also be used cyclohexene oxide and phenyl glycidyl ether which may be substituted by alkyl radicals containing 1 to 4 carbon atoms.

By cyclic acetals there are to be understood compounds of saturated or unsaturated aliphatic or cycloaliphatic diols with aliphatic aldehydes or thioaldehydes, preferably formaldehyde.

As cyclic acetals, cyclic formals of $\alpha,\omega$-diols with 2 to 8, preferably 2 to 4 carbon atoms are particularly suitable, the carbon chain of which may be interrupted by an oxygen atom at intervals of 2 carbon atoms. There are preferably used cyclic formals of the Formula (III),

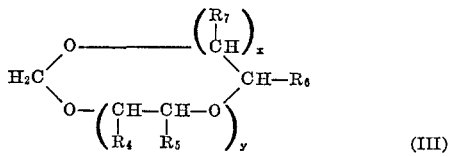

in which $R_4$, $R_5$, $R_6$ and $R_7$ are identical or different and each stand for a hydrogen atom, a phenyl radical, an aliphatic alkyl radical with 1 to 5, preferably 1 to 3 carbon atoms or an aliphatic alkyl radical with 1 to 5, preferably 1 to 3 carbon atoms substituted by 1 to 3 halogen atoms, preferably chlorine atoms, $x$ is a whole number from 1 to 7, preferably 1 to 4, and $y$ is zero or, with $x$ being 1, $y$ is a whole number from 1 to 3.

Especially suitable are cyclic formals of saturated aliphatic $\alpha,\omega$-diols with 2 to 8, preferably 2 to 4 carbon atoms as well as cyclic formals of oligoglycols, i.e. cyclic formals of the Formula (IV)

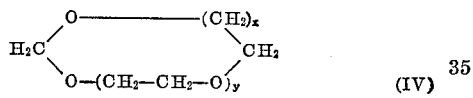

in which $x$ and $y$ have the meanings given above.

As cyclic acetals, glycol formal (1,3-dioxolane), butanediolformal (1,3-dioxepane) and diglycolformal (1,3,6-trioxocane) are especially suitable. 4-chloro-methyl-1,3-dioxolane and hexanediolformal (1,3-dioxonane) as well as butenediolformal (1,3-dioxacycloheptene-(5)) are also suitable.

For changing the flowability, 0.05 to 5, preferably 0.1 to 2% by weight of tercomponents with several polymerizable groups in the molecule, for example alkyl glycidyl formals, polyglycoldiglycidyl ethers, alkanediol diglycidyl ethers or bis(alkanetriol)-triformals, may be incorporated in the copolymers of formaldehyde or trioxane by polymerization.

Alkyl glycidyl formals are compounds of the Formula (V),

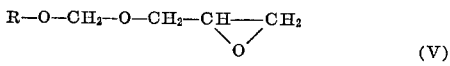

in which R stands for an aliphatic alkyl radical with 1 to 10, preferably 1 to 5 carbon atoms. Especially suitable are alkyl glycidyl formals of the above formula with linear, saturated aliphatic alkyl radicals, for example, methyl glycidyl formal, ethyl glycidyl formal, propyl glycidyl formal and butyl glycidyl formal.

Polyglycol diglycidyl ethers are compounds of the Formula (VI)

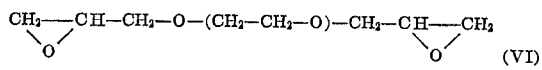

in which $x$ is a whole number from 2 to 5. Especially suitable are polyglycol diglycidyl ethers of the above formula, in which $x$ is 2 or 3, for example diethylene glycol diglycidyl ether and triethylene glycol diglycidyl ether.

By alkanediol diglycidyl ethers there are to be understood diglycidyl ethers of aliphatic diols with 2 to 6, preferably 2 to 4 carbon atoms and diglycidyl ethers of cycloaliphatic diols with 6 to 10 carbon atoms. Especially suitable are diglycidyl ethers of aliphatic $\alpha,\omega$-diols with 2 to 4 carbon atoms, for example ethylene glycol diglycidyl ether, 1,3-propanediol-diglycidyl ether and 1,4-butanediol-diglycidyl ether. Suitable alkanediol diglycidyl ethers are also 1,3-butanediol-diglycidyl ether and 1,4 - dimethylolcyclohexane-diglycidyl ether.

By bis(alkanetriol)-triformals there are to be understood compounds with a linear and two cyclic formal groups, especially compounds of the Formula (VII)

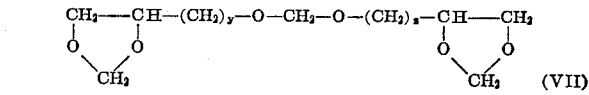

in which $y$ and $z$ each are a whole number 3 to 9, preferably 3 or 4. Especially suitable are symmetrical bis(alkanetriol)-triformals of the above formula, in which $y$ and $z$ are identical, for example bis(1,2,5-pentanetriol)-triformal and preferably bis(1,2,6-hexanetriol)-triformal.

The polyacetals used in accordance with the invention have molecular weights within the range of from 5,000 to 200,000, preferably 10,000 to 100,000; their crystallite melting points are within the range of from 50° to 170° C.

As mixing component for polyacetals there may be used polymers the softening point of which is below the crystallite melting point of the polyacetal used in a given case advantageously within the range of +50 and +160° C., and the second order transition temperature of which is within the range of −120 and +30° C., preferably −80° and 0° C.

As mixing component there are advantageously used homo- and copolymers of olefinically unsaturated compounds of the Formula (VIII),

in which $R_8$ stands for a hydrogen atom or a methyl radical and $R_9$ stands for a hydrogen atom, a carboxyl group, an alkyl carboxyl group with 2 to 10, preferably 2 to 5 carbon atoms, an acyloxy group with 2 to 5, preferably 2 or 3 carbon atoms or a vinyl radical.

There may be used for example:

1. Homo- and copolymers of $\alpha$-olefins, for example polyethylene, copolymers of ethylene and propylene, copolymers of ethylene and acrylic acid ester, copolymers of ethylene and methacrylic acid ester, copolymers of ethylene and acrylic acid. Particularly suitable are polyethylene as well as copolymers of ethylene with vinyl acetate and copolymers of ethylene with acrylic acid esters, the content of ethylene being within the range of 40 and 90, preferably 50 and 80%.
2. Homo- and copolymers of 1,3-dienes with 4 or 5 carbon atoms, for example polybutadiene, polyisoprene, copolymers of butadiene and styrene, copolymers of butadiene and acrylonitrile.
3. Homo- and copolymers of vinyl esters, for example poly (vinyl acetate), poly (vinyl propionate), poly (vinyl butyrate).
4. Homo- and copolymers of acrylic and methacrylic acid esters, for example poly (ethyl acrylate), poly (butyl acrylate), poly (butyl methacrylate), poly (hexyl methacrylate), poly (2 - ethyl - hexyl-methacrylate), poly (octyl methacrylate).

As mixing component polyethers and polyesters are also used. As polyethers there are used homo- and copolymers of the above defined cyclic ethers, for example poly (ethylene oxide), poly (propylene oxide), poly (3,3-dimethyl-oxetane). Copolymers of ethylene oxide and propylene oxide as well as polytetrahydrofurane are particularly suitable.

By polyesters there are to be understood compounds of dibasic carboxylic acids and diols; polyesters of linear aliphatic dicarboxylic acids with 4 to 12 carbon atoms with the above defined $\alpha,\omega$-diols, for example polyesters of sebacic acid and ethylene glycol, and polyesters of sebacic acid and butanediol, are particularly suitable.

The molecular weights of the polymer mixing components may vary within wide limits. Products of a molecular weight of 1000 to 1,000,000, preferably 1,000 to 300,000, are suitable; very good results are obtained with mixing components of a molecular weight within the range of 5,000 and 150,000.

The improvement of the impact strength of the moulding compositions in accordance with the invention depends on the concentration and to a great extent on the particle size of the added polymer in the mixture.

The concentration of the admixed polymers is within the range of from 0.1 to 10% by weight, preferably 0.1 to 5% by weight; very good results are obtained with mixtures containing 0.3 to 3% by weight of the polymer.

The diameters of the particles of the admixed (disperse) phase are within the range of 0.1 to 5 microns, preferably 0.1 to 3 microns; particle diameters within the range of from 0.2 to 2 microns are particularly advantageous. The admixture of the said polymers with the polyacetals is carried out on any desired mixing aggregate, for example rollers, kneaders of extruders. The mixing temperatures are advantageously above the crystalline melting point of the polyacetals and are within the range 150° to 250° C., preferably 170° to 200° C.

The particle size of the disperse phase depends not only on the nature and concentration of the polymers to be mixed, but also, for example, on the mixing temperature, the melt viscosity and the nature of the mixing aggregate. It has proved very advantageous to examine and control the optimizing of the mixing conditions as regards the particle size by means of electron microscopic examinations. This determination of the particle size is carried out, for example, as follows: a small sample of the molten mixture is taken with a spatula in a suitable place of the mixing aggregate. From the cooled sample a thin cut is prepared in known manner with an ultramicrotome, from which a transmitted light picture is taken by means of an electron microscope. A 10,000 fold total magnification is sufficient to easily measure and count the particles. In this manner, the optimum mixing conditions for the different moulding compositions as regards the particle size can exactly be determined. When keeping constant the optimum mixing conditions so obatined, the moulding compositions can be obtained in a reproducible manner with the desired particle size of the disperse phase. It is then sufficient to take an electron microscopic picture at relatively large intervals for controlling.

The moulding compositions in accordance with the invention may be mechanically reduced, for example by cutting to pieces or grinding, to obtain granules, chips, flocks or powder. They are thermoplastic and can be processed by injection-moulding, extrusion, melt spinning or deep drawing; they are suitable for the manufacture of semifinished or finished products, such as shaped articles, for example bars, ribbons, rods, plates, films, sheets, tubes or hoses, as well as houseware, for example bowls or cups, and machine pieces, for example cases or gear wheels.

The following examples serve to illustrate the invention, but are not intended to limit it:

EXAMPLES

In a single screw extruder with 3 heating zones, 2 kilograms of the polyacetal were homogenized with the desired amount of the mixing component (residence time in the cylinder: about 4 minutes) and then granulated. The particle size or particle size distribution of the mixing component was determined by electron microscopic photographs. The particle diameter of the mixing-component within the range of 0.1 and 5.0 microns in accordance with the invention was obtained by varying the conditions of extrusion, for example the temperature or number of revolutions of the screw. Plates of 60 x 60 x 2 millimeters were injection-moulded from these mixtures and subjected to a drop test for determining the impact strength. In this test, the plates clamped in a frame were exposed to an impact stress by allowing a falling hammer of 500 grams to drop vertically from different heights onto the plates. The drop height at which the test specimen just withstood the kinetic energy of the dropping hammer without breaking was taken as measure for the impact strength.

For characterizing the mixtures in accordance with the invention, the following Table 1 shows the chemical composition of the polyacetal and the mixing component, the melt viscosity of the individual components ($i_2$ at 190° C.) or their molecular weight (MW), the second order transition temperature of the mixing-component ($T_g$), the particle diameter of the disperse phase in the finished mixture ($\phi$) and the drop height. (The drop height is indicated in mean values of 10 measurements each.)

TABLE 1

| Example | Polyacetal Composition (percent by weight) | $i_2$ | Mixing component Composition (percent by weight) | $i_2$ | M.W. | Amount (percent) | $T_g$ (° C.) | Diameter of particle ($\mu$) | Drop height (cm.) |
|---|---|---|---|---|---|---|---|---|---|
| 1 | Copolymer of trioxane and ethylene oxide (98/2). | 9.0 | | | | | | | 25 |
| 2 | Terpolymer of trioxane, ethylene oxide and butanediol diglycidyl ether (97.95/2/0.05). | 1.0 | | | | | | | <25 |
| 3 | Homopolymer of formaldehyde with terminal acetate groups. | 9.2 | | | | | | | 25 |
| 4 | Copolymer of trioxane and ethylene oxide (98/2). | 9.0 | Polyethylene | 8.6 | | 1.0 | [1] −80 | 0.5–5.0 | 180 |
| 5 | do | 9.0 | do | 10.0 | | 1.0 | [1] −80 | 0.2–3.0 | 165 |
| 6 | do | 9.0 | Copolymer of ethylene and propylene (56/44). | | 140,000 | 0.5 | [1] −40 | 0.5–5.0 | 100 |
| 7 | do | 9.0 | Copolymer of ethylene and vinyl acetate (67/33). | 24.0 | | 1.0 | [1] −15 | 0.1–1.0 | 250 |
| 8 | do | 9.0 | do | 24.0 | | 2.5 | [1] −15 | 0.2–2.0 | 300 |
| 9 | do | 9.0 | Copolymer of ethylene and vinyl acetate (72/28). | 15.0 | | 3.0 | [1] −15 | 0.2–2.0 | 400 |
| 10 | Terpolymer of trioxane, ethylene oxide and butanediol diglycidyl ether (97.95/2/0.05). | 1.0 | do | 24 | | 3.0 | [1] −15 | <0.1 | <25 |
| 11 | do | 1.0 | do | 12 | | 3.0 | [1] −15 | 0.1–1.0 | 100 |
| 12 | Copolymer of trioxane and ethylene oxide (98/2). | 15.0 | Copolymer of ethylene and acrylic acid ethyl ester (65/35). | 15 | | 3.0 | −10 | >5.0 | <25 |
| 13 | Homopolymer of formaldehyde with terminal acetate groups. | 9.2 | do | 15 | | 5.0 | −10 | 0.5–5.0 | 200 |
| 14 | Copolymer of trioxane and ethylene oxide (98/2). | 9.0 | Poly (2-ethyl-hexyl-methacrylate) | | 110,000 | 5.0 | [2] −50 | 0.5–5.0 | 100 |
| 15 | do | 9.0 | Poly (ethylene oxide) | | 15,000 | 3.0 | [2] −67 | 0.5–5.0 | 125 |
| 16 | do | 9.0 | Copolymer of ethylene oxide and propylene oxide (80/20). | | 50,000 | 5.0 | [2] −70 | 0.5–5.0 | 300 |
| 17 | do | 9.0 | Polytetrahydrofurane | | 38,000 | 1.0 | [2] −79 | 0.1–2.0 | 125 |

[1] L. Bohn, Kolloid-Zeitschrift 194 (1964), 10.
[2] J. Brandrup and E. H. Immergut, "Polymer Handbook," 1966.

What is claimed is:

1. A thermoplastic molding composition consisting essentially of a mixture of (a) 99.9 to 90% by weight of a polyacetal which is a homopolymer or copolymer of formaldehyde or trioxane of an average molecular weight of 5,000 to 200,000 and (b) 0.1 to 10 % by weight of a polymer selected from (1) homopolymers of alpha-olefins and copolymers consisting of units derived from mixtures of alpha-olefins, and (2) homopolymers of cyclic ethers and copolymers of cyclic ethers consisting of units derived from compounds of the formula

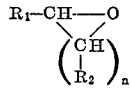

in which $R_1$ and $R_2$ are identical or different and each stand for a hydrogen atom, a phenyl radical, an aliphatic alkyl radical of 1 to 5 carbon atoms or an aliphatic alkyl radical with 1 to 5 carbon atoms substituted by 1 to 3 halogen atoms and $n$ is a whole number from 1 to 4, said (b) polymers having an average molecular weight of 1,000 to 1,000,000, a softening temperature below the crystallite melting point of said polyacetal, a second order transition temperature in the range $-120°$ to $+30°$ C. and being present in the mixture in the form of particles of diameters in the range 0.2 to 2.0 microns.

2. A process for making thermoplastic molding compositions which comprises homogeneously mixing (a) from 99.9% to 90% by weight of a polyacetal which is a homopolymer or copolymer of formaldehyde or trioxane of an average molecular weight of 5,000 to 200,000 and (b) 0.1 to 10% by weight of a polymer selected from (1) homopolymers of alpha-olefins and copolymers consisting of units derived from mixtures of alpha-olefins, and (2) homopolymers of cyclic ethers and copolymers of cyclic ethers consisting of units derived from compounds of the formula

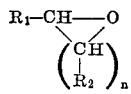

in which $R_1$ and $R_2$ are identical or different and each stand for a hydrogen atom, a phenyl radical, an aliphatic alkyl radical of 1 to 5 carbon atoms or an aliphatic alkyl radical with 1 to 5 carbon atoms substituted by 1 to 3 halogen atoms and $n$ is a whole number from 1 to 4, said (b) polymers having an average molecular weight of 1,000 to 1,000,000, a softening temperature below the crystalline melting point of said polyacetal, a second order transition temperature in the range $-120°$ to $+30°$ C. and being present in the mixture in the form of particles of diameters in the range 0.2 to 2.0 microns, said (a) and (b) component being mixed at a temperature above the crystallite melting point of the polyacetal and within the range 150° to 250° C.

3. A product as claimed in claim 1 wherein as component (a) a copolymer of trioxane with 0.1 to 20% by weight of cyclic ethers or cyclic acetals is used.

4. A product as claimed in claim 1 wherein as component (a) a copolymer of trioxane with 0.1 to 20% by weight of cyclic ethers of the formula

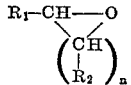

is used, in which $R_1$ and $R_2$ are identical or different and each stand for a hydrogen atom, a phenyl radical, an aliphatic alkyl radical with 1 to 5 carbon atoms or an aliphatic alkyl radical with 1 to 5 carbon atoms substituted by 1 to 3 halogen atoms, and $n$ is a whole number from 1 to 4.

5. A product as claimed in claim 1 wherein as component (a) a copolymer of trioxane with 0.1 to 20% by weight of a cyclic ether and 3 ring members is used.

6. A product as claimed in claim 1 wherein as component (a) a copolymer of trioxane with 0.1 to 20% by weight of cyclic ethers of the formula

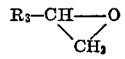

is used, in which $R_3$ stands for an oxygen atom, a phenyl radical, a saturated aliphatic alkyl radical with 1 to 3 carbon atoms or a saturated aliphatic alkyl radical with 1 to 3 carbon atoms substituted by 1 to 3 halogen atoms.

7. A product as claimed in claim 1 wherein as component (a) a copolymer of trioxane with 0.1 to 20% by weight of cyclic formals of alpha-omega-diols with 2 to 8 carbon atoms, the carbon chain of which may be interrupted by an oxygen atom at intervals of 2 carbon atoms is used.

8. A product as claimed in claim 1 wherein as component (a) a terpolymer of trioxane with 0.1 to 20% by weight of cyclic ethers or cyclic acetals and 0.05 to 5% by weight of alkyl glycidyl formals, polyglycol diglycidyl ethers, alkanediol diglycidyl ethers or bis(alkanetriol)-triformals is used.

9. A thermoplastic molding composition consisting essentially of a mixture of (a) 99.9 to 90% by weight of a polyacetal which is a homopolymer or copolymer of formaldehyde or trioxane of an average molecular weight of 5,000 to 200,000 and (b) 0.1 to 10% by weight of a polymer selected from homopolymers of alpha-olefins and copolymers consisting of units derived from mixtures of alpha-olefins, said (b) polymers having an average molecular weight of 1,000 to 1,000,000, a softening temperature below the crystallite melting point of said polyacetal, a second order transition temperature in the range $-120°$ to $+30°$ C. and being present in the mixture in the form of particles of diameters in the range 0.1 to 5 microns.

10. A molding composition according to claim 9 wherein said (b) polymer is a homopolymer of an alpha-olefin.

11. A molding composition according to claim 9 wherein said (b) polymer is a copolymer consisting of units derived from mixtures of alpha-olefins.

12. A molding composition according to claim 1 wherein said (b) polymer is a copolymer of ethylene oxide and propylene oxide.

13. A thermoplastic molding composition consisting essentially of (a) 99.9 to 90% by weight of a polyacetal which is a homopolymer or copolymer of formaldehyde or trioxane of an average molecular weight of 5,000 to 200,000 and (b) 0.1 to 10% by weight of a polymer selected from homopolymers of cyclic ethers and copolymers of cyclic ethers consisting of units derived from the formula

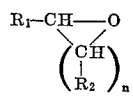

in which $R_1$ and $R_2$ are identical or different and each stand for a hydrogen atom, a phenyl radical, an aliphatic alkyl radical of 1 to 5 carbon atoms or an aliphatic alkyl radical with 1 to 5 carbon atoms substituted by 1 to 3 halogen atoms and $n$ is a whole number from 1 to 4, said (b) polymers having an average molecular weight of 1,000 to 1,000,000, a softening temperature below the crystallite melting point of said poylacetal, a second order transition temperature in the range $-120°$ to $+30°$ C. and being present in the mixture in the form of particles of diameters in the range 0.2 to 2.0 microns.

14. A product as claimed in claim 1 wherein as component (a) a terpolymer of trioxane with 0.1 to 20% by weight of cyclic ethers or cyclic acetals and 0.05 to 5% by weight of diglycidyl ethers of aliphatic diols with 2 to 6 carbon atoms or of cycloaliphatic diols with 6 to 10 carbon atoms is used.

References Cited
UNITED STATES PATENTS

| | | | |
|---|---|---|---|
| 3,476,832 | 11/1969 | Pritchard | 260—874 |
| 3,485,910 | 12/1969 | Kennedy | 260—874 |
| 3,551,121 | 1/1971 | Tanaka | 260—897 |
| 3,631,124 | 12/1971 | Burg | 260—823 |
| 3,600,458 | 8/1971 | Jamison | 260—830 |

FOREIGN PATENTS

| | | |
|---|---|---|
| 378,816 | 1962 | Japan. |
| 1,345,218 | 10/1963 | France. |

PAUL LIEBERMAN, Primary Examiner

U.S. Cl. X.R.

260—67 FP, 830 R, 836, 837 R, 874, 887, 897 R, 901